United States Patent [19]
Bates

[11] 4,249,657
[45] Feb. 10, 1981

[54] TIRE CHAIN HOLDER

[76] Inventor: Kenneth L. Bates, 1003 SW. Palatine St., Portland, Oreg. 97219

[21] Appl. No.: 51,691

[22] Filed: Jun. 25, 1979

[51] Int. Cl.³ .............................................. A44B 7/00
[52] U.S. Cl. ................................... 206/335; 206/348; 206/560; 248/346
[58] Field of Search ............... 206/335, 348, 560, 564; 248/346

[56] References Cited

U.S. PATENT DOCUMENTS

| | | | |
|---|---|---|---|
| 4,138,079 | 2/1979 | Ehret et al. | 248/346 |
| 4,189,125 | 2/1980 | Little | 248/346 |

FOREIGN PATENT DOCUMENTS

| | | | |
|---|---|---|---|
| 573060 | 12/1958 | Belgium | 206/335 |
| 483698 | 6/1952 | Canada | 206/335 |
| 426927 | 12/1974 | U.S.S.R. | 206/335 |

*Primary Examiner*—Joseph Man-Fu Moy

[57] ABSTRACT

A holder for organizing, securing and storing a tire chain for a vehicle wheel when chain is not in use and for facilitating application of chain when being applied. An apparatus of this invention consists of a platform with a pair of spaced apart mounds, around, behind, and in front of which the chain cross links are juxtapositionally aligned in reverse order of application to the tire. A pair of trays on each side thereof store the excess links. A rod passes through each tray parallel to the platform and is threaded through the end links of each cross chain, thereby securing and preventing chain entanglement. Upon application, the vehicle is mounted upon the mounds and the rods removed, leaving all chain links unrestricted in position for applying chain.

2 Claims, 5 Drawing Figures

TIRE CHAIN HOLDER

BACKGROUND OF THE INVENTION

The field of invention relates to vehicle tire chains that provide traction in snow and ice, and in particular, to holding and storing devices for such when chains are not in use and devices for facilitating application of the chain when being applied.

Notwithstanding the prior art in this field, consisting of many types of devices for assisting in the storing and applying of tire chains, most conventional tire chains are still applied today by either jacking up the vehicle one wheel at a time, hoisting the vehicle at a service station, or using a small commercially available clamp, and driving the vehicle forward or backward, to roll the chain around the tire and apply the chain in the conventional manner. The task remains time consuming and awkward. At its best it is a nuisance, filled with the frustration of entangled chains and exposure to the cold; at its worst it is miserable and dangerous.

The prior art either make no provision for securing the chain from self-entanglement as typlified by U.S. Pat. No. 2,022,804 issued to J. Garey, U.S. Pat. No. 3,937,263 issued to Milburn L. Hill and Ken M. Sawyer, and U.S. Pat. No. 4,031,939 issued to Joseph De Martini; or were limited in the function of organization of the cross links and simplification of structure and manufacture as typlified by U.S. Pat. No. 3,893,500 issued to Vernon L. Planz.

My invention is distinguished from this prior art in that it provides for each and every set of cross links of a conventional tire chain to be secured in the same relative position one to another each time the chain is packaged in the holder. Each and every set of cross links is juxtapositionally aligned in the holder in reverse order to which it will be applied. The chain is threaded and locked by rods through certain links preventing self-entanglement thereof. Once the threading, locking rods are removed, the chain is instantly ready for application, and the user is exposed to the cold and inclement weather for a minimum amount of time.

My invention is a simplification of prior art in that I have found that approaches and ramps typical to prior art are not required for a vehicle tire to mount typical supporting elements and have eliminated said ramps. In addition, the one-piece, configured, rigid plastic construction of my invention is lightweight and lends itself to ease of manufacture. Finally, by using my invention, I can apply my tire chains to my tires in less than five minutes. Furthermore, with the invention I can apply my tire chains blindfolded (a requirement for those who must apply chains at night with insufficient illumination). It is the objective of this invention to provide the same speed and assurance to the average driver, man or woman, when they apply their tire chains.

SUMMARY OF THE INVENTION

The instant invention was conceived to provide a holder for the application of a tire chain that would minimize the time the user is exposed to snow, freezing temperatures and other adverse weather conditions, that would provide a system of packaging the chain in the holder, so organized, that a user could apply the chain at night where insufficient illumination exists, and that would improve the convenience of the application of a conventional tire chain to a tire.

This function is achieved by utilizing the system of a pair of raised mounds spaced apart that is common to prior art and so modifying prior art with an apparatus consisting of a pair of base structures, spaced apart, each of which is surrounded by upstanding edges forming a pair of trays, each with two sides and two ends, connected to one of the sides of each tray and extending longitudinally from end to end and between the trays is a raised platform with an upper and lower surface upon which chain cross links are juxtapositionally athwart aligned. Configured as the upper surface of said platform, from side to side, a predetermined distance being measured from one end to the center of the holder or beyond, are a pair of mounds, spaced apart an appropriate distance to support a tire of a vehicle when mounted thereon. Configured as the lower surface of said platform are vertical ribs which intersect both longitudinally and transversely one to another to support the platform and provide traction in snow. The upstanding end sides of each base contain generally aligned holes to receive rods, longer in length than the shortest interior dimension of opposite ends of the tray. Said rods are inserted to be generally parallel with and adjacent to the platform, being threaded through certain cross links or side links of the chain and held in place by the aligned holes and the tension of the chain links, thereby restricting all cross links from entanglement until the rods are manually removed.

In use, the user packages the tire chain, aligning and securing the chain cross links upon the holder in reverse order of their application by threading a rod through certain of the side chain links and/or links of the cross links in each tray, thereby preventing the chain from self-entangling during storage. Upon application, the user places a packaged holder either in front of or behind the appropriate wheels, drives the vehicle upon the holders, thereby mounting said wheels simultaneously without jacking up the vehicle. The user then removes the threading, locking rods and applies the chain in a conventional manner. The user then drives vehicle off the holders and stores them within the vehicle ready for repackaging once the chains are removed from the tires.

A tire chain holder of such construction provides for:

The disentanglement and packaging of tire chains at the convenience of the user in a comfortable environment after each use.

A minimal amount of handling of the chains during application.

A minimum amount of time the user is exposed to adverse weather conditions during application.

The elimination of the task of jacking up the vehicle.

The realization of the objective of men and women applying tire chains in substantially five minutes.

The realization of the objective of applying chains at night with insufficient illumination in a minimum of time.

The simplification of manufacture of a chain holder to a one-piece, lightweight, molded apparatus.

DESCRIPTION OF THE PREFERRED EMBODIMENT

Figure 1:
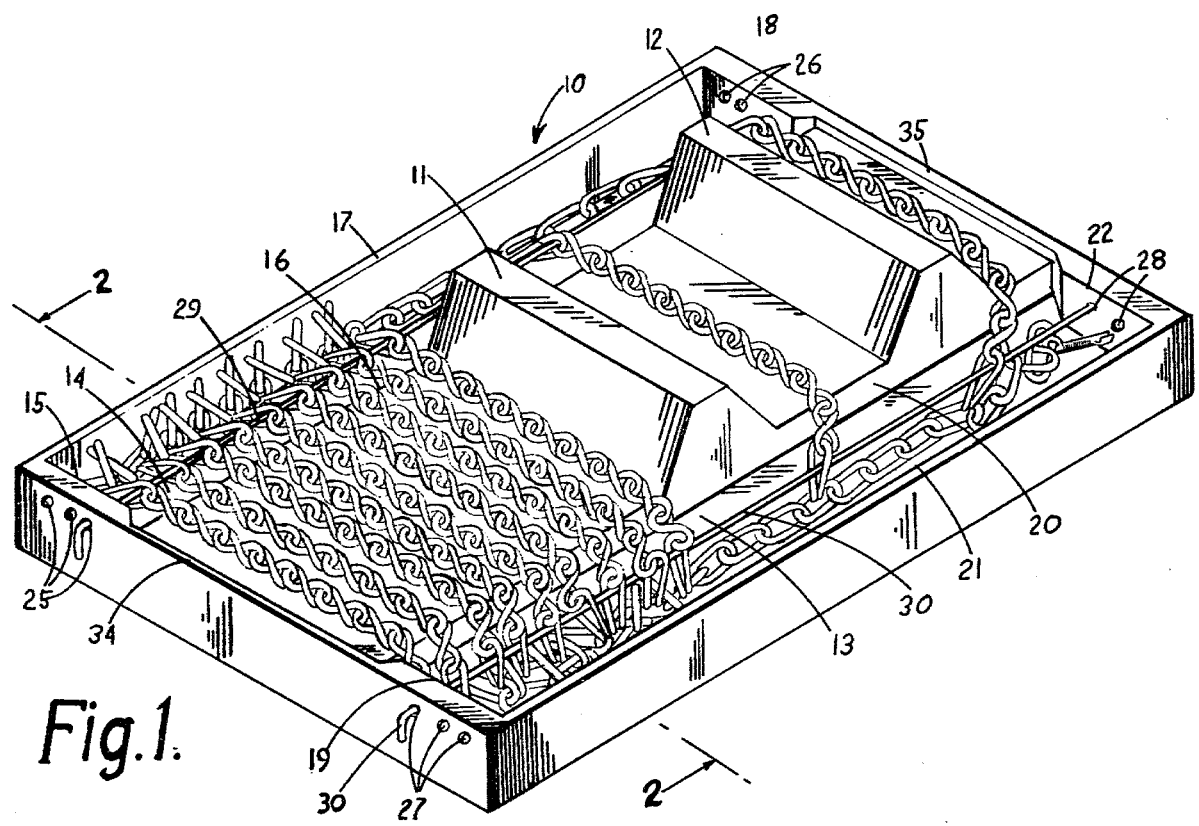
FIG. 1 is a view of a tire chain holder with a tire chain arranged thereon to show how the cross chains are juxtapositionally positioned across the platform and in front of, between, and behind the mounds, and how rods thread through certain of the links to secure the arrangement to the holder.
Figure 3:
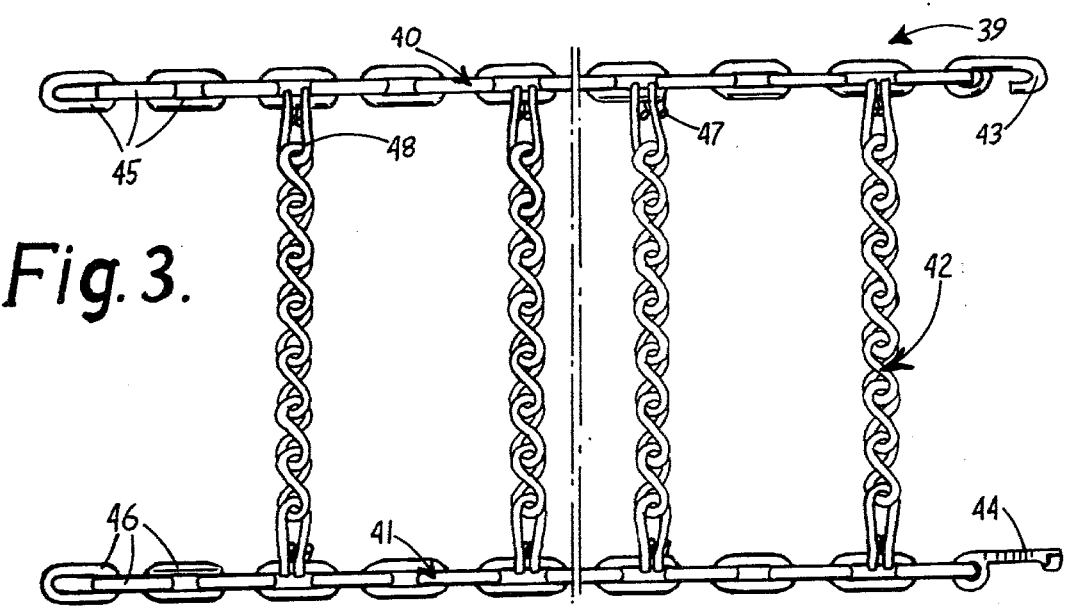
FIG. 3 is a representation of the end sections of a typical conventional tire chain to show the side chains, cross links, and the types of connections at the ends of the side chains.

Referring to the drawings, there is shown in FIG. 1 the tire chain holder 10 of this invention in combination with a conventional tire chain 39, FIG. 3, arranged thereon. The holder 10 is a one-piece molded device preferably of rigid plastic material capable of supporting a wheel of a vehicle upon the higher mounds 11 and 12 thereof.

Figure 2:
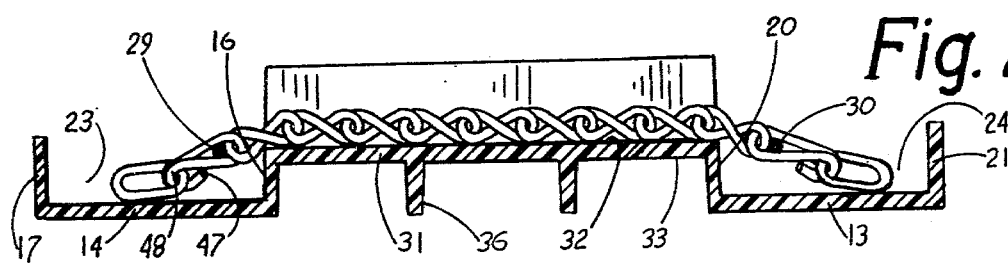
FIG. 2 is a cross-section view through the holder to show the formation of a tray on each side of the platform and the position of the rods which secure the chain to the holder.

Basically the holder 10 comprises two base structures 13 and 14, surrounded by upstanding edges 15, 16, 17, 18 and 19, 20, 21 and 22, forming a pair of trays 23 and 24 as shown in FIG. 2, each with two lateral sides 16, 17 and 20, 21, and two end sides 15, 18 and 19, 22. The end sides 15, 18 and 19, 22 contain generally aligned holes 25, 26 and 27, 28, the function of which is to retain the inserted threading, locking rods 29 and 30 which are longer in length than the shortest interior dimension of opposite ends of tray 23 or 24. Said threading, locking rods 29 and 30. Not being a part of molded holder 10, function by securing certain cross chain links 42 and/or side chain links 40 and 41 of chain 39 within the trays 23 and 24. Further function will be explained hereinafter. The retaining holes 25, 26 and 27, 28, spaced apart, provide means of alternate positioning the threading, locking rods 29 and 30 to accommodate chains of variously sized tires. A further function of trays 23 and 24 is to accommodate excess chain 39 not packaged elsewhere thereon.

Figure 5:
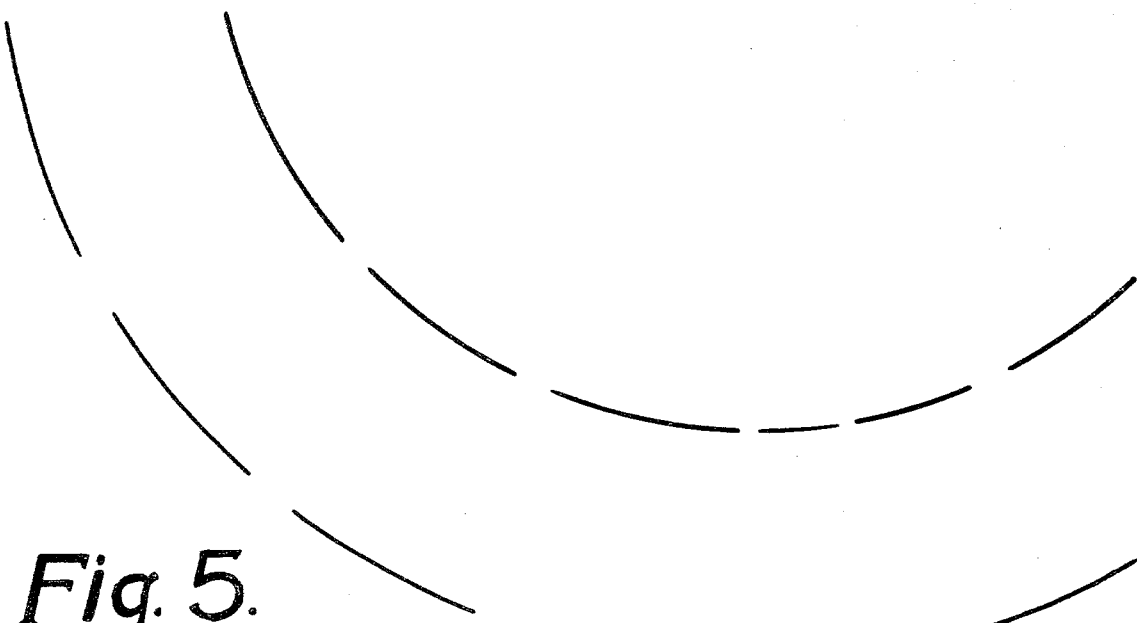
FIG. 5 is a side view of the holder showing a portion of a tire and vehicle wheel mounted thereon in position for applying a chain to a tire. The rod is removed.
Figure 5:
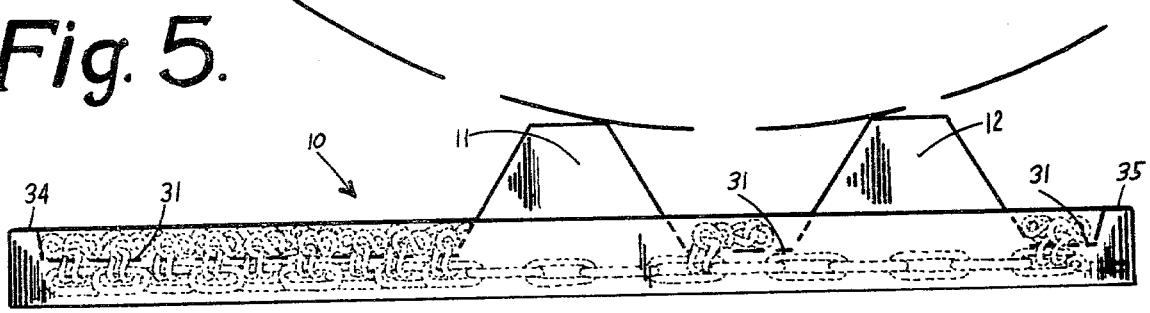

A raised platform 31 with an upper surface 32 and a lower surface 33, shown in FIG. 2 is molded in conjunction with upstanding lateral side 16 of base 14 and with upstanding lateral side 20 of base 13 and extends longitudinally between end sides 15, 18 and end sides 20, 22 of trays 23 and 24. The configuration of the upper surface 32 of the raised platform 31 extends transversely from lateral side 16 to lateral side 20 in the formation as shown in FIG. 5: a raised edge 34, a length of platform 31, extending a predetermined distance in relationship to holder 10, a mound 11, a shorter length of platform 31, a like raised mound 12, a like shorter length of platform 31, a like raised edge 35. The function of each to be further herein described.

Figure 4:
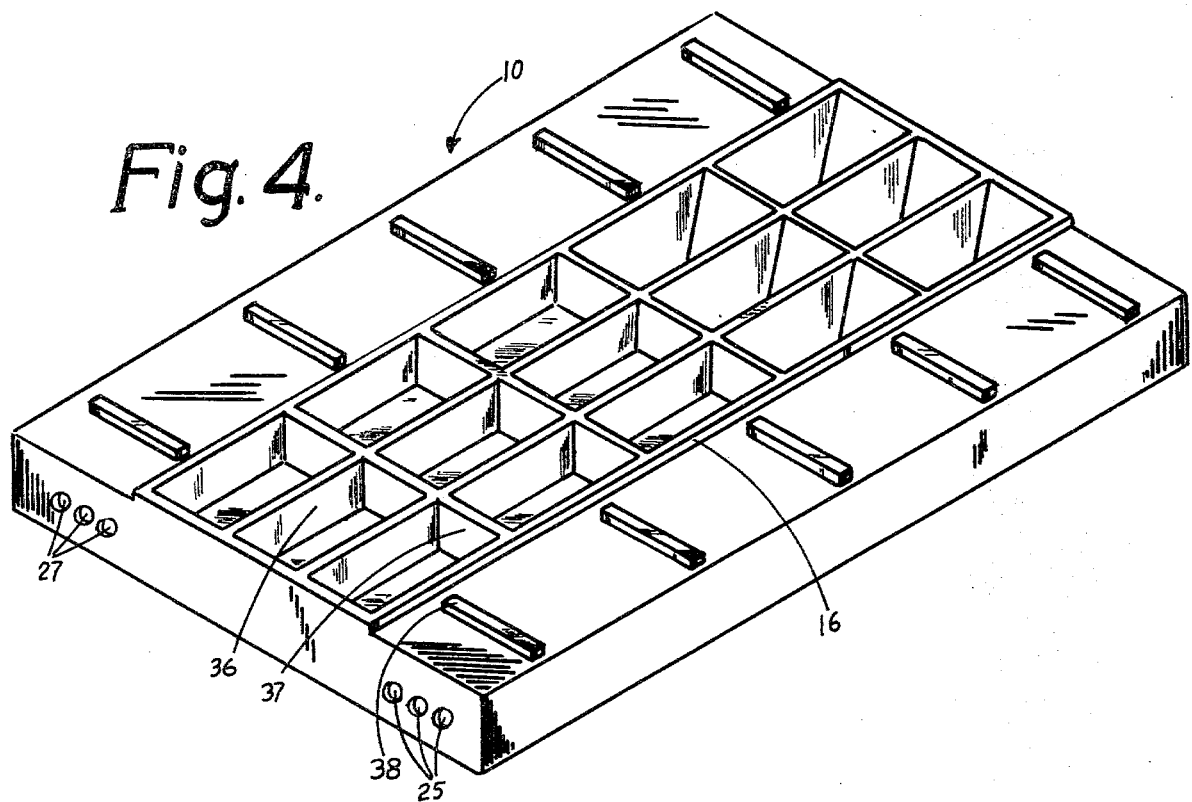
FIG. 4 is a view of the bottom of the holder to show the construction of the cleats and the intersecting ribs.

There is shown in FIG. 4 the lower surface 33 of platform 31 and trays 23 and 24, which is molded in the configuration of vertical ribs 36 which intersect longitudinally and athwart 37. The functions of said ribs 36 which are to provide support for platform 31 and to provide traction in snow and ice. The lower surfaces of trays 23 and 24 have molded onto them certain cleats 38 also providing further traction.

It is understood that chain holder 10 is to be used in conjunction with conventional tire chain 39, shown in FIG. 3, which have a pair of side chain links 40 and 41 interconnected with a number of transversely extending cross chain links 42, spaced apart. The end link 43 of one end of the side chain 40 comprises an open hook 43, and the end link 44 of the other side chain 41 consists of a latching device 44. The end links 45 of side chain 40 opposite the open hook 43 are closed links 45. The end links 46 of side chain 41, opposite the latching device 44 are closed links 46. The function of the open hook 43 is to connect with a link 45 on the opposite end of the side chain 40 on the inside of the tire. The function of the latching device 44 is to connect with a link 46 on the opposite end of the side chain 41 and latch and lock the side chain 41 on the outside of the vehicle tire.

It is understood that in the use of the holder 10 there will normally be two or four in number and the user will normally package the chain 39 onto the holder 10 after each use by spreading the chain 39 to its full extentions on a hard substantially flat surface, such as a floor, and completely disentangling all links 40, 41 and 42 of chain 39 and placing the chain 39 so that the unjoined ends 47 of the end links 48 of each set of cross chain links 42 that connect the cross chain links 42 to the side chain links 40 and 41 are positioned down against the said flat surface, and grasping side chains 40 and 41, one by the open hook 43 and one by the latching device 44 and placing the cross links 42 nearest to the said hook 43 and latching device 44 onto the platform 31 at the end of holder 10 that contains the shorter length of platform 31 between the raised edge 35 and the mound 12, with one end link 48 of the cross links 42 located in tray 23, and the opposite end link 48 located in the opposite tray 24. The user then inserts threading, locking, rod 29 through one of holes 26 and the other threading, locking rod 30 through one of like holes 28, located in the upstanding end sides 18 and 22 respectively, which is nearest to the cross links 42 previously positioned, and inserts threading, locking rods 29 and 30 through the end links 48 of cross link 42. (It is conceivable that the user may elect to use links other than end links 48 of the cross links 42 of links located in the side chain 40 or 41 which would perform the indentical function.) In like manner, the user places the next adjacent cross links 42 between the mounds 11 and 12, places the end links 48 in respective trays 23 and 24 and extends and inserts the threading, locking rods 29 and 30 through the end links 48 of said cross links 42. The remaining cross links 42 are then juxtapositionally aligned on platform 31, starting with the next adjacent cross chain links 42 to those just previously positioned. Immediately after each set of cross chain links 42 are positioned, they are sequentially threaded and secured with the threading, locking rods 29 and 30. After all sets of cross links 42 are positioned, threaded, and secured, the threading, locking rods 29 and 30 are further extended; and rod 29 is inserted through one aligned retaining hole 25; and threading, locking rod 30 is inserted through one aligned retaining hole 27, located in the upstanding end sides 15 and 19 respectively and nearest to the last previously positioned cross chain link 42. After packaging thusly, it becomes apparent that the function of the raised edges 34 and 35 is to retain the cross chain links 42 adjacent thereto on to platform 31.

It is understood that the user will package the second holder 10 with a like companion tire chain 39 and will proceed in like manner to disentangle and position the like chain 39 as heretofore described and will grasp the side chains 40 and 41, each one by the end having the closed links 45 and 46 and will package holder 10 in like manner as to the previously packaged holder 10 by placing the cross links 42 fartherest from the open hook 43 and the latching device 44 onto the platform 31 in the space between raised edge 35 and mound 12 nearest thereto. Thus when applying chain 39 and like companion chain 39 to two tires, both chains will latch and lock on the outside of the vehicle's tires.

After packaging two or four of chain 39 onto like number of holder 10, the user places holders 10 in the storage area of the vehicle to remain until time of application, knowing that chains cannot self-entangle. Upon application, the user places one holder 10 either in front of or behind an appropriate tire, places the other holder(s) 10 in like position on the other appropriate tire(s), drives vehicle upon the mounds 11 and 12, thus supporting two or four wheels at the same time. The user then removes the threading, locking rods 29 and 30 by withdrawing them from the retaining holes 25 and 27 respectively, then withdrawing them from all of the cross chain end links 48, and then withdrawing them from retaining holes 26 and 28. The user then applies the chain 39 to the tire in a conventional manner removing the cross links 42 from the platform 31 in reverse order to which the user packaged them. Upon completion of the latching and locking of two or four of chain 39 upon like number of tires, the user drives vehicle off holders 10 and replaces holders 10 in the storage area of the vehicle to be repackaged as heretofore explained, once the chain 39 has been removed from the tire.

It is noted that the user could package chain 39 in holder 10 in the reverse order without affecting the process or the results.

It is also noted that the threading, locking rods 29 and 30 must be manually removed and will not self-disengage the retaining holes 25, 26, 27 or 28 because of the restriction the packaged chain 39 has upon them.

It is noted that when the invention product is used in conjunction with commercially available decals placed conspicuously thereon instructing the user the proper side of the holder 10 to place to the outside of the tire, the chain 39 may be packaged quickly and correctly. Furthermore, holder 10 may be speedily placed to the appropriate tire in order to minimize the time the user is exposed to outside temperatures.

It is noted that when the invention product is used in conjunction with commercially available shoulder length universal fitting, thin plastic gloves, the user does not consume valuable time trying to protect clothing and can still apply chain 39 to a tire by the feel of the individual parts.

It is further noted that the invention product can be stored in separate sections of the vehicle so that the user has preknowledge of the appropriate holder 10 to apply to the appropriate tire, thus being able to place the holder 10 correctly in even less time and in poor illumination.

It is noted that since the vehicle does not have to be jacked up, and since holder 10 contains chain 39 completely disentangled, drivers of all ages and either sex can readily apply tire chains in times of emergency, on hills, and at night.

It is further noted that the user will disentangle chain 39 and package holder 10 in a comfortable environment and thus reduce the time the user is exposed to adverse climatic conditions.

It is further noted that although the holder 10 may be manufactured of several parts and of diverse materials, the preferred embodiment is a one-piece, rigid, plastic construction, which is lightweight, easily manufactured, and quickly mass-produced.

The present invention has been described in relation to a preferred embodiment. It is understood that one of ordinary skill in the art can make various alternations and substitutions and other such changes to the holder 10 as described herein without departing from the original concept. It is therefore intended that the present invention be limited only by the definition contained in the following claims.

I claim:
1. A tire chain holder comprising:
   a pair of bases, spaced apart, each of which is surrounded by upstanding edges forming a pair of trays, each with lateral sides and end sides, which contain in the end sides means of retaining locking devices; and
   a raised platform with an upper and lower surface formed in conjunction with one of the lateral sides of each tray and extending between the pair of trays; and
   configured upon the upper surface of the platform, a raised edge, a length of platform, a raised mound, a shorter length of platform, a like raised mound, a like shorter length of platform, a like raised edge; and
   configured within the lower surface of said platform vertical ribs which intersect longitudinally and transversely one with the other; and
   locking devices retained by and extending between the end sides of each tray.
2. A tire chain holder as defined in claim 1 in combination with a vehicle tire chain having a pair of side chains interconnected longitudinally with transversely extending cross chains, spaced apart, wherein:
   one or more cross chains lie athwart between the raised edge and a mound; a single cross chain lies awthart between mounds; and the remaining longer length of platform contains the remaining lengths of cross chain juxtapositionally aligned athwart, with each set of cross chains of the tire chain having one end link located in one tray and the opposite end link located in the opposite tray; and
   locking devices retained in the end sides of the trays and threaded through cross chain links and/or side chain links and being retained in the opposite end sides of the trays; and
   said trays are used to store excess chain not provided for on said platform.

* * * * *